United States Patent [19]

Schwartz

[11] Patent Number: 5,495,428
[45] Date of Patent: Feb. 27, 1996

[54] METHOD FOR DETERMINING COLOR OF AN ILLUMINANT IN AN IMAGE BASED ON HISTOGRAM DATA

[75] Inventor: Michael S. Schwartz, Belmont, Mass.

[73] Assignee: Eastman Kodak Company, Rochester, N.Y.

[21] Appl. No.: 114,715

[22] Filed: Aug. 31, 1993

[51] Int. Cl.⁶ ..................................................... G06K 9/38
[52] U.S. Cl. .................. 364/526; 358/522; 358/518; 382/167; 382/171; 382/274; 364/514 R
[58] Field of Search .................... 364/526, 514 R; 358/500, 509, 518, 522; 382/51, 163, 167, 171, 168, 271, 274

[56]             References Cited

U.S. PATENT DOCUMENTS

| | | |
|---|---|---|
| 4,648,051 | 3/1987 | Wandell et al. . |
| 4,661,907 | 4/1987 | Arnone et al. . |
| 4,685,071 | 8/1987 | Lee . |
| 4,719,503 | 1/1988 | Craver et al. ........................ 348/717 |
| 4,779,142 | 10/1988 | Freeman et al. ........................ 358/313 |
| 4,812,904 | 3/1989 | Maring et al. . |
| 4,977,448 | 12/1990 | Murata et al. . |
| 4,989,080 | 1/1991 | Ito . |
| 4,992,963 | 2/1991 | Funt et al. . |
| 5,045,933 | 9/1991 | Tatsumi . |
| 5,060,060 | 10/1991 | Udagawa et al. . |
| 5,089,976 | 2/1992 | Cate et al. . |
| 5,105,466 | 4/1992 | Tsujiuchi et al. . |
| 5,130,789 | 7/1992 | Dobbs et al. ........................ 358/500 |
| 5,278,641 | 1/1994 | Sekizawa et al. ........................ 358/527 |

*Primary Examiner*—Ellis B. Ramirez
*Assistant Examiner*—Edward Pipala
*Attorney, Agent, or Firm*—Raymond L. Owens

[57]                ABSTRACT

An electronic method measures the color cast of a digital representation of a natural scene. Colors of the natural scene are represented in digital electronic form as pixels. Neighborhoods of pixel colors in a chrominance histogram are isolated. Neighborhoods may be isolated by convolving the chrominance histogram with a two-dimensional filter. Lighting color from the scene is measured from isolated color neighborhoods by: a) determining lines in a chrominance plane which lie along major axis of isolated color neighborhoods, and b) selecting a convergence-chrominance value near which the detected lines converge. Lines in the chrominance plane may be weighted so that lines from neighborhoods that are more reliable indicators of lighting contribute more to the convergence-chrominance than less lines from less reliable neighborhoods. The image is then transformed so as to map the measured lighting value to another value, such as neutral.

21 Claims, 6 Drawing Sheets

| ITEM IN FIG. 1 | DESCRIPTION | BRIGHT-NESS | INITIAL u', v' | REMAPPED u', v' |
|---|---|---|---|---|
| 1 | WHITE GLOVES | 78 | .205, .493 | .208, .488 |
| 2 | CAUCASIAN SKIN | 63 | .252, .509 | .254, .506 |
| 3 | GOLD NECKLACE | 70 | .218, .509 | .221, .506 |
| 4 | YELLOW HAT | 76 | .237, .547 | .234, .546 |
| 5 | BLUEISH-GRAY BACKGROUND | 12 | .197, .466 | .199, .464 |
| 6 | BLACK GOWN | 7 | .208, .484 | .210, .483 |

METHOD FOR DETERMINING COLOR OF AN ILLUMINANT IN AN IMAGE BASED ON HISTOGRAM DATA

FIELD OF THE INVENTION

The invention relates to the general field of electronic processing of color images, and in particular to methods and apparatus that correct color casts in a digitized natural image.

BACKGROUND

Natural images which have been scanned into electronic image processing systems often have undesirable color casts which should (desirably) be removed. These casts may result from imperfections and errors within the image acquisition process. For example a scanned photograph may have been taken under lighting conditions which were inappropriate for the film type.

One method for determining how big a correction needs to be made for each picture is for an operator to add color to the image interactively until it looks "right." This method has the disadvantages of requiring a great deal of operator attention and judgement, and requiring a highly accurate color monitor.

One set of automatic methods involve assumptions about what colors various parts of the image should be. These methods assume, for instance, that bluish areas near the tops of pictures are sky, that the average color for a scene is gray, or that colors within a certain range are flesh. These methods are sensitive to image content; however, the assumption may simply be wrong for many images.

Another approach to determining the degree of color cast is to estimate the color of the illuminant of the original scene, as recorded in the image. In actual scenes, the human visual system tends to perceive the illuminant as neutral. Therefore, a color transform which maps the recorded color of the illuminant to neutral will tend to produce a balanced picture.

One method for making this estimate is for the system to detect specular highlights in the picture. Specular highlights in a natural scene tend to have the same color as the scene illuminant. This method has three disadvantages. First, not every scene contains specular highlights. Second, it only determines the color cast at bright luminances. Finally, because highlights tend to be the brightest objects in a scene, their color is particularly susceptible to being distorted by non-linearities in the capture process.

A method has been proposed by Lee (U.S. Pat. No. 4,685,071) which takes advantage of the fact that the reflected light from many objects contains both a specular and a diffuse component. Lee's method estimates the color of the scene illuminant by detecting the specular component and estimating its chromaticity.

Lee's method has the advantage that natural scenes do generally contain a number of differently colored objects having the proper reflectance properties. However the method contains a time-consuming pre-filtering step. In addition, the method either completely accepts or completely rejects any given candidate measure of scene illuminant, thereby giving an inordinate amount of importance to marginal subsets of the image. That is, measures that are highly likely to be accurate receive the same weight as measures that are less likely to be accurate. Finally the method does not account for distortions produced by the non-linearities of the photographic process. These non-linearities make measured colors a less reliable indicator of illuminant as those colors approach the edge of the input gamut. They also cause the measured illuminant chrominance to vary with luminance.

It is the object of the present invention to provide an improved method for detecting and correcting for scene illuminant based on the distribution of chrominances in an image.

SUMMARY OF THE INVENTION

The present invention is based on the analysis of chrominance histograms. When the two-dimensional chrominance histogram for all the pixels corresponding to a particular object in a natural scene are plotted, the resulting plot generally has an oblong shape, and the long axis generally points towards the chrominance of the illuminant of the scene. The preferred embodiment of the current invention performs the estimation of the chrominance of the illumination in two phases. In the first phase, a chrominance histogram is accumulated over the entire image. In the second phase, the histogram is analyzed to determine the chrominance of the illuminant. In summary, the process consists of the following steps:

1) Accumulate a chrominance histogram from the picture.

2) Determine the location of all peaks in the histogram.

3) For each local peak, determine its location and the direction of its major axis.

4) Determine the location of the chrominance value which comes closest to the intersection of all the lines determined in step 3. This chrominance should equal the chrominance of the illuminant in the original scene.

The determination of the intersection in step 4 does not give equal importance to each line. Some lines are less reliable because of the intrinsic properties of their corresponding peaks. Other lines are less reliable because they correspond to highly saturated colors. The invention provides a means for computing a weight for each line, such that the weight corresponds to the reliability of that line as an indicator of the color of the scene illuminant.

As an additional control on the final estimate of illuminant color, it is possible to incorporate a Driori knowledge about the likely location of neutral in such a way that the system does not overrule a strongly indicated specular estimate, but does modify a weakly indicated specular estimate.

The method incorporates these factors by finding a chrominance value which minimizes an error function.

In addition to computing the amount of color cast in the pictures as a whole, this invention also provides a means for computing the amount of color cast as a function of brightness.

DETAILED DESCRIPTION

Figures 1, 2:
FIG. 1 is a representation of an image before modification.
FIG. 2 shows a comparison of image segments before and after modification using the method of the present invention.
Figure 3:
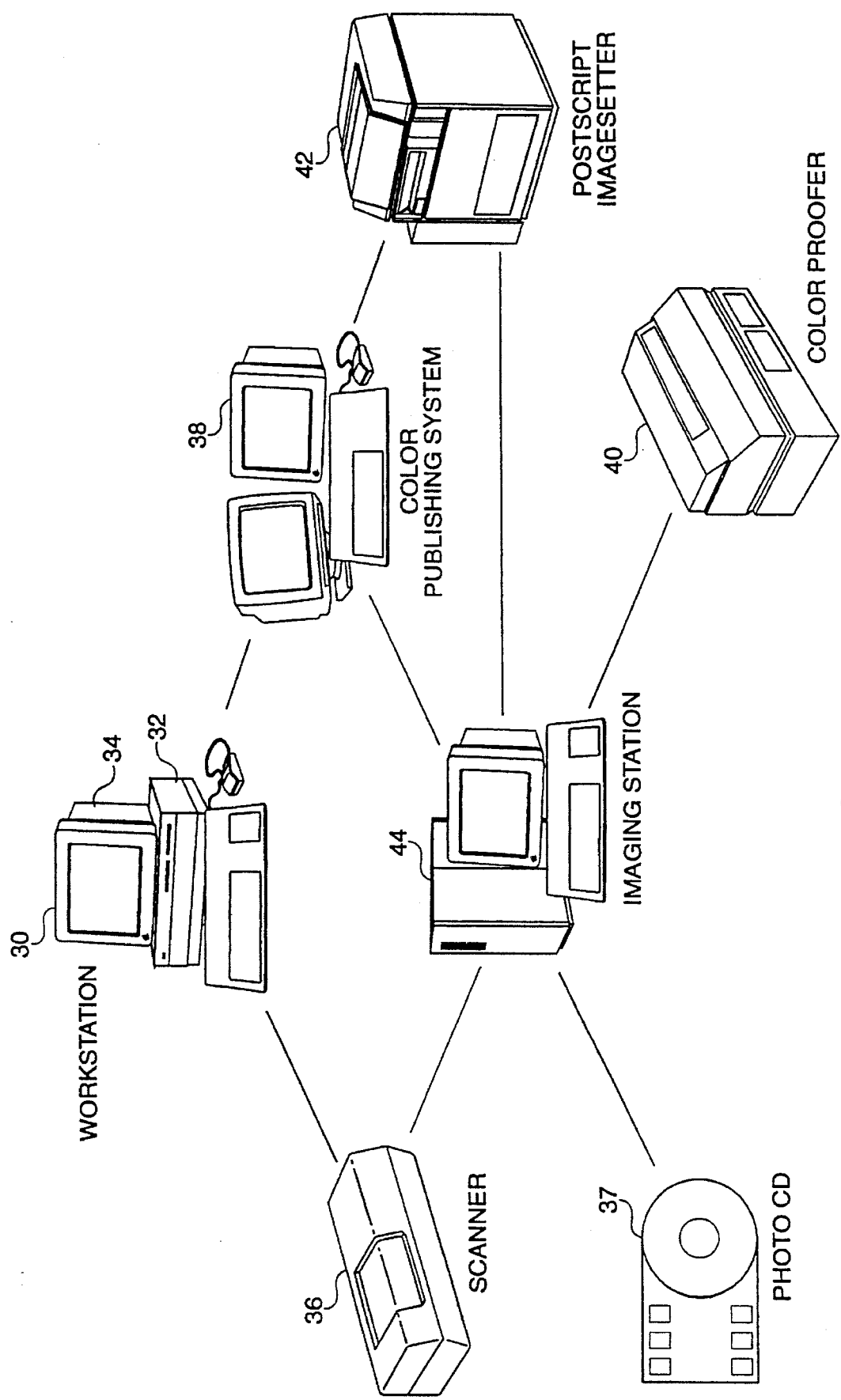
FIG. 3 is an illustration of an image processing system suitable for the method of the present invention.
Figure 4A:
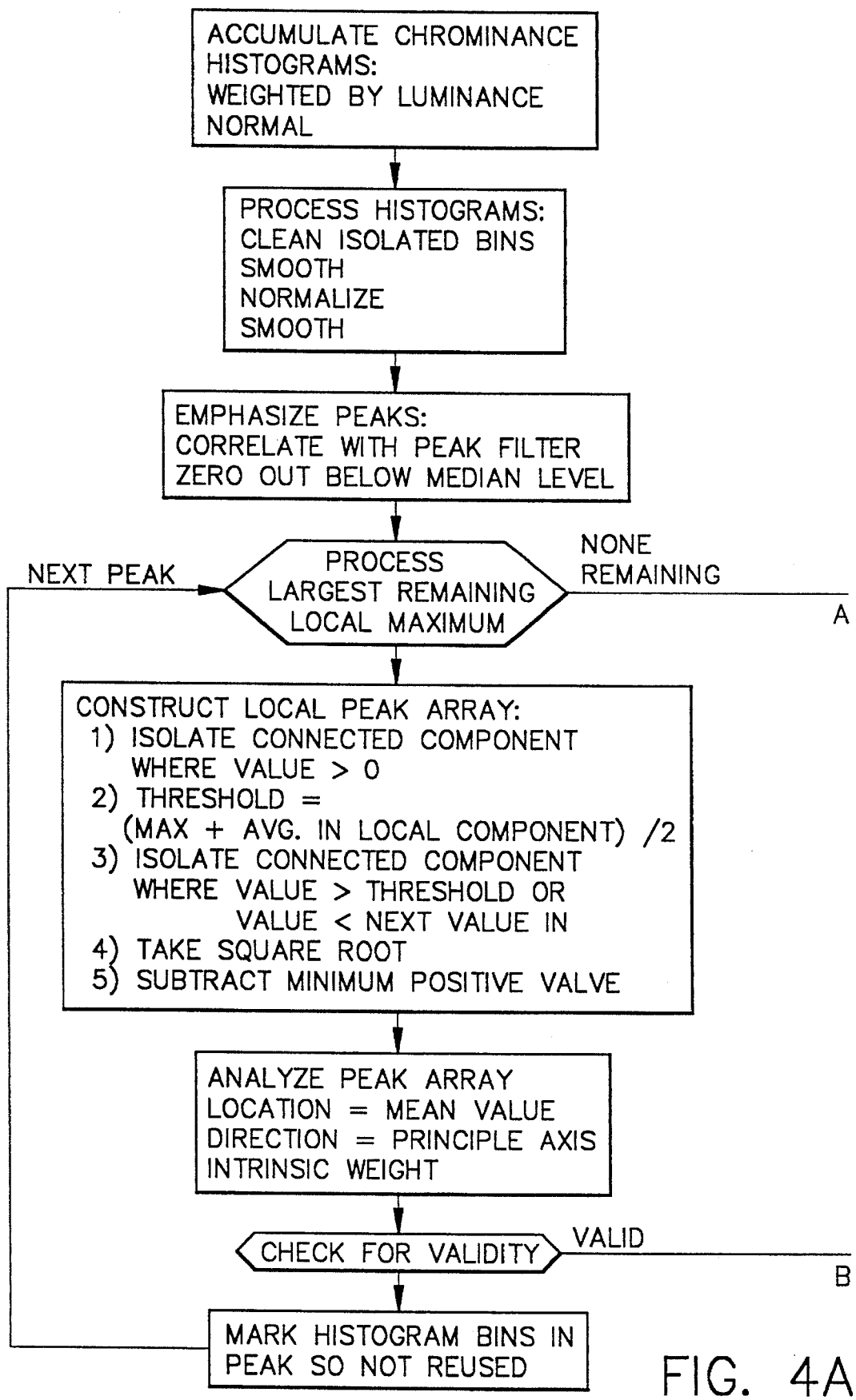
FIG. 4 is a flow chart illustrating steps of a method for detecting peaks in a chrominance histogram.
Figure 4B:
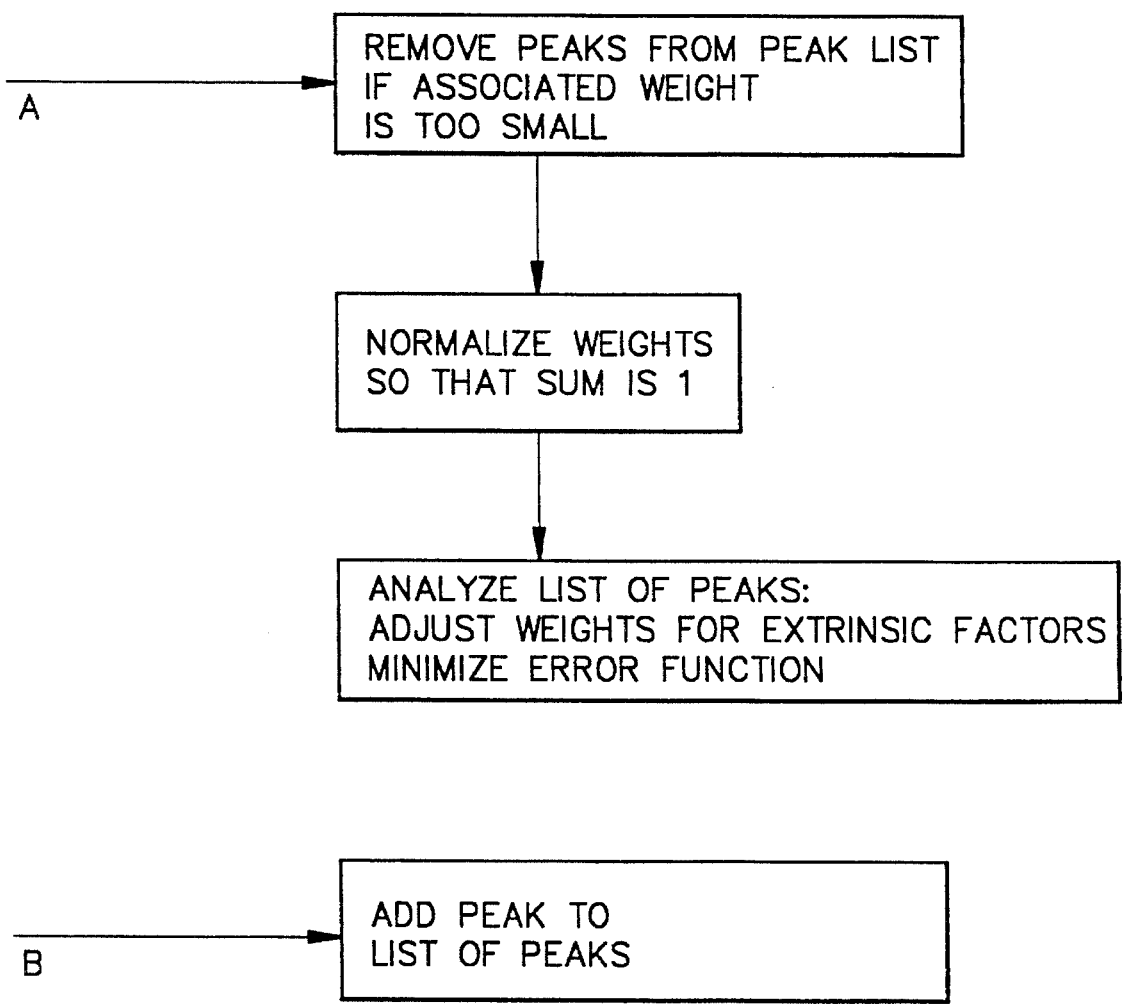
Figure 5:
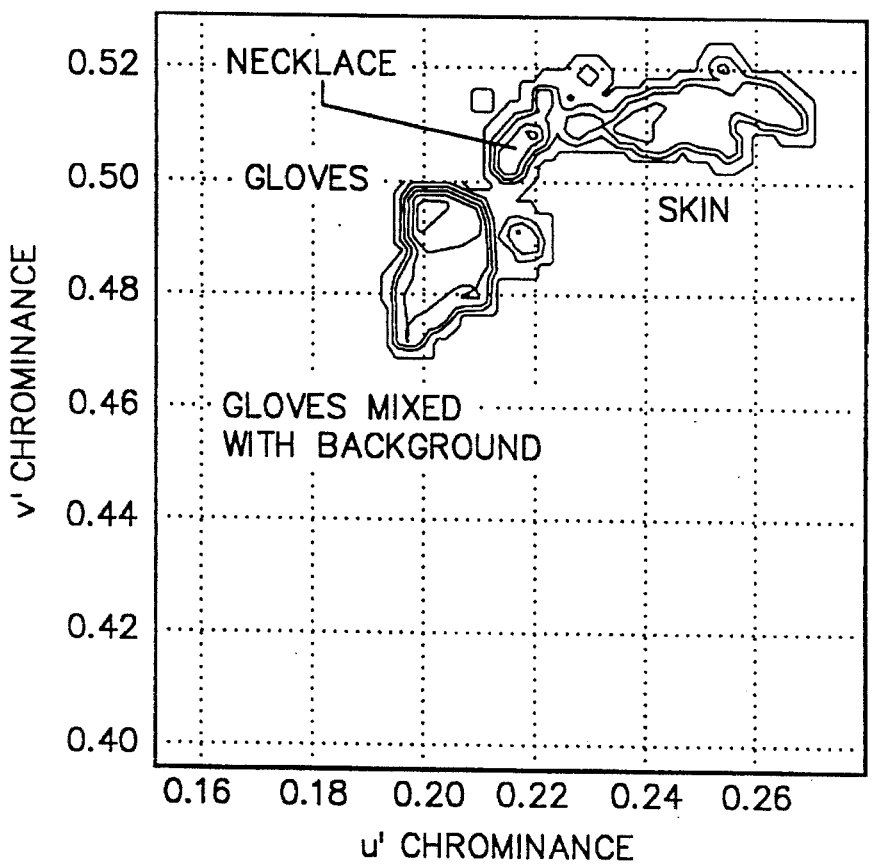
FIG. 5 is a two-dimensional histogram plot of pixels of the image of FIG. 1.
Figure 6:
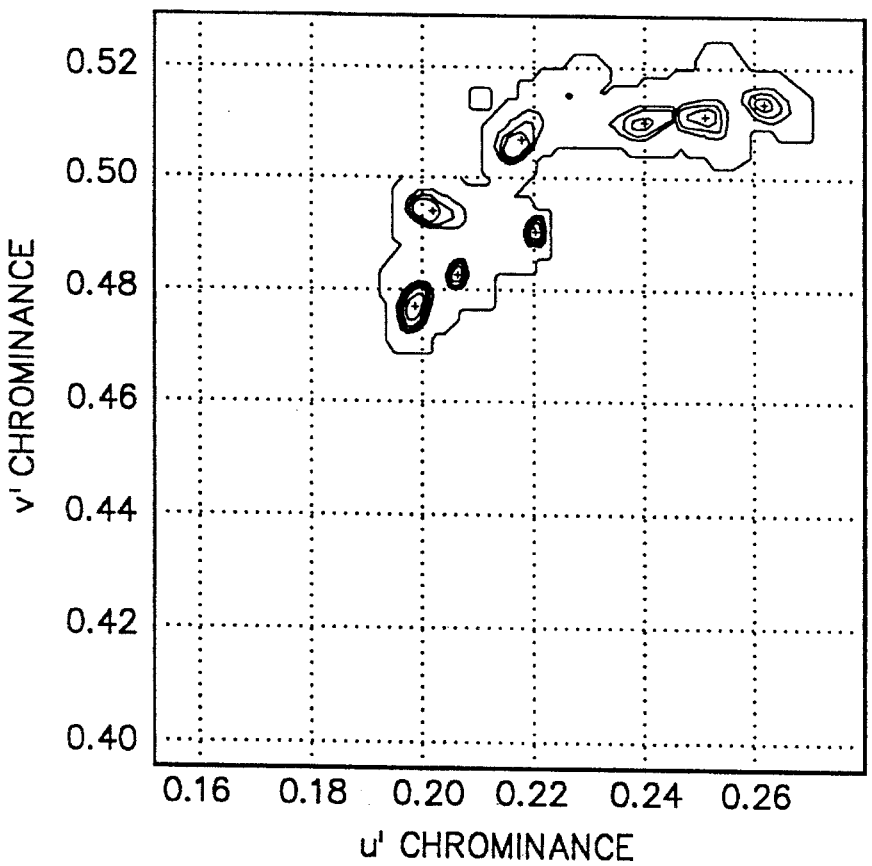
FIG. 6 is the histogram of FIG. 5 with additional contours indicating peaks.
Figure 7:
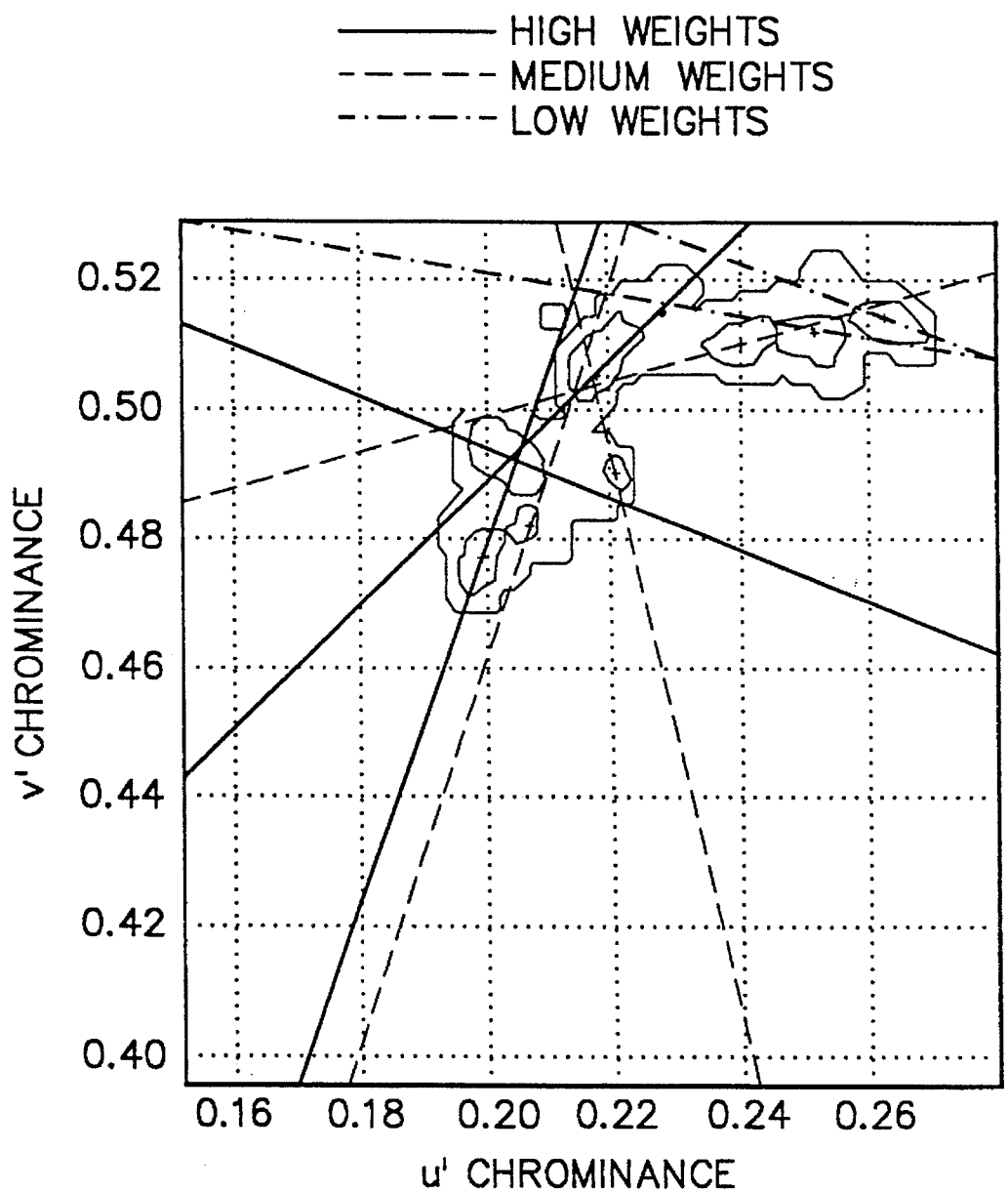
FIG. 7 is the histogram of FIG. 5 with additional lines showing the major axis of the peaks shown in FIG. 6.

The present invention can apply widely to any of a variety of electronic systems that process color images. For example, the invention may be embodied as part of a system as illustrated in FIG. 3. A workstation 30, such as a Macintosh II/fx (TM) or Quadra (TM) computer, is equipped with a 24-bit graphics card 32 and a color monitor 34. Standard Macintosh Toolbox (TM) routines are used to display pictures on the color screen. Standard menus allow the operator to control the operation of the machine, and a transformation as described below may be incorporated as an application program.

The operator begins by reading a picture into the system from a scanner 36 or other input device, such as a Photo CD disk 37, which produces an electronic image representation. The image is displayed on the color monitor 34. The operator can select from a pull-down menu a transform of the present invention as described in more detail below.

Alternately, the transform may be incorporated into a color publishing system, such as the Kodak Prophecy (TM) system 38, which is built around an image accelerator-equipped Sun SPARC (TM) platform. The color publishing system allows the operator to "soft-proof" the image by correcting the image to compensate for printing characteristics and by manipulating the image characteristics with a set of easily understood icons. Using the Prophecy (TM) system, an operator can perform many image manipulation operations such as tone and contrast correction, image sharpening and blurring, silhouetting, selective color changes, cloning, masking, image rotation, etc. The transform may be applied automatically to every picture prior to operator evaluation or as a selectable option. The system transforms the image using the inventive method and returns a modified image which may then be displayed, printed on a color proofer 40 or image setter 42, stored, transmitted or subjected to further processing.

The present invention is based on the analysis of chrominance histograms. It can be understood, in part, from the following observation. When the two-dimensional chrominance histogram for all the pixels corresponding to a particular object in a natural scene is plotted, the resulting plot generally has an oblong shape, and the long axis generally points towards the chrominance of the illuminant of the scene.

This observation can be explained by considering the nature of reflection from surfaces. The reflection from most real objects consists of both diffuse and specular components, with the chrominance of the specular component being the same as the chrominance of the illuminant. These two components have different angular distributions in the original scene. That is, the diffuse component tends to reflect over a wide angle in the original scene, while the specular component tends to reflect most strongly in a narrow range of scattering angles relative to the illuminant source. Because most objects are rounded, the pixels corresponding to different parts of an object represent different scattering angles between the illuminant and the capturing device and therefore represent different mixtures of the two components.

One method of exploiting this phenomenon is to isolate individual objects from the scene and examine the pixels from each object separately. The preferred embodiment of the current invention performs the estimation of the chrominance of the illumination in two phases. In the first phase, a chrominance histogram is accumulated over the entire image. This phase can occur relatively quickly, even in a large image. In the second phase, the histogram is analyzed to determine the chrominance of the illuminant. This works because in most scenes, some number of objects do correspond to identifiable peaks in the chrominance histogram. In summary, the process consists of the following steps:

1) Accumulate a chrominance histogram from the picture.

2) Determine the location of all peaks in the histogram.

3) For each local peak, determine its location and the direction of its major axis.

4) Determine the location of the chrominance value which comes closest to the intersection of all the intersection of all the lines determined in part 3. This chrominance should equal the chrominance of the illuminant in the original scene.

The ability of the process to detect objects from the histogram can be enhanced by weighting each pixel's contribution to the histogram by an amount which depends on its luminance. This is because objects tend to be brighter where the specular component is relatively large, and brighter objects better reflect the chrominance of the illuminant.

Histogram Accumulation

A histogram, as used here, is a measure of the number of pixels that have a particular color. When color is represented in the u', v', L* color space, the L* dimension is luminance, and the u and v dimensions are chrominance. A chrominance histogram can be formed by dividing the u,v plane into discrete areas (each referred to as a bin) and counting the number of pixels whose chrominance falls within each bin's area. In the preferred embodiment, the histogram is accumulated through the following steps.

In the first step, two histograms are accumulated. For the first (normal histogram), each pixel causes the corresponding chrominance bin to increase by 1. For the second histogram, each pixel causes the corresponding chrominance bin to increase by an amount proportional to the luminance at that pixel.

In the second step, the histograms are operated on to reduce the impact of noise. The normal histogram is "cleaned-up" by zeroing out all bins that are completely surrounded by empty bins. Then both histograms are smoothed.

Finally the second histogram is divided by the normal histogram. That is, each bin value of the luminance-weighted histogram is divided by the corresponding bin value of the normal histogram. As a result, the value at each chrominance bin is equal to the average luminance at that chrominance. An additional smoothing step is then performed.

As a variation to forming a histogram that has average luminance values, the histogram can select a maximum luminance value for all pixels having a particular chrominance.

Peak Location

After the histogram has been processed as described above, the individual peaks must be isolated and analyzed.

The isolation of the peaks is performed through the following steps. First the histogram is correlated with a peak detection filter. That is, a correlation value is generated for each pixel as the image is convolved with a 2-dimensional, bell-shaped function. In the preferred embodiment, the peak detection filter is a gaussian function whose width is adjusted so as to emphasize histogram details whose radius in the u'v'-chrominance plane is about 0.003. The correlation array is given by:

product = (histogram − avg(histogram)) (X)
(peak_filter − avg(peak_filter))
if(product > 0)
$$\text{correlation} = \frac{\text{product}^2}{\text{sd2(histogram)} * \text{sd2(filter)}}$$
else
    correlation = 0

Where (X) is the convolution operator, and avg() and sd2() refer to the local average and local standard deviation squared taken over the non-zero area of the peak filter. The product function will range from −1 to 1. Of course, any of a wide variety of peak detection filters can be used, and it has been found that the final result does not depend strongly on the filter.

The correlation array is then set to zero at all values below a threshold. The threshold is determined by taking a fixed percentage of the smallest positive correlation values. In the preferred embodiment the smallest half of the non-zero correlation values are eliminated in this step.

The correlation array is then processed so as to isolate and analyze the individual peaks. Each peak is assumed to occupy neighborhood around a local maximum in the correlation array. The local maxima of the correlation array are processed in order of decreasing size. As each peak is isolated, the points belonging to it are marked so that they cannot be used in processing subsequent peaks. That is, a record is kept identifying peak pixels already processed, and they are excluded when isolating other peaks.

The isolation of the individual peak is an iterative process. In a first pass, the connected set of points in the correlation array having positive correlation values is isolated. In a second pass, neighborhood is used to determine a threshold. This threshold is set equal to half-way between the maximum correlation value of the peak and the average correlation value of the positive points isolated during the first pass. This threshold is used to isolate the final peak, which consists of the connected neighborhood whose correlation values are either above the threshold or smaller than the next point in (where "in" is toward the correlation peak).

One might expect that the use of the threshold is unneeded—one could simply move out from the local maximum until the values stopped falling. Unfortunately, the data is noisy enough so that it is possible for small fluctuations to create local maxima near the center of the peak. The use of the threshold insures that points near the top of the peak get included in it.

The determination of the connected peak is done in such a way that the resulting data set is connected and reasonably compact. The processing starts at the local maximum and spirals out from it in square, concentric shells. Any given point is included only if the next point in is also included. To simplify the algorithm, this "next point in" is taken to be the next point in horizontally or vertically, depending on whether the point is above, below, to the left of, or to the right of the local maximum. For points diagonally displaced from the local maximum, the next point in is taken to be the next point in diagonally.

In order to add to the compactness of the peak, an additional two refinements are used. First, a diagonal point is accepted only if its two neighbors on the same shell have also been accepted. Second, from the third shell on, an off-diagonal point is excluded unless all its nearest neighbors on the next shell in are included.

Axis Determination

The correlation values from the isolated peak are copied into a peak array and further processed. First the square root is taken from each peak value. This converts the correlation squared data in the original correlation array into a correlation. Then the minimum value inside the peak is subtracted. This lowers the influence of points on the margin of the peak array.

The values within the peak array are then used to compute a location, and direction. The location is equal to the mean location of the points under the peak. The direction is determined by the eigenvector of the correlation matrix A determined by the peak. The formulas for these are:

$$[u_{mean}, v_{mean}] = \Sigma\ [u', v'] * \text{peak}(u', v')/\Sigma\ \text{peak}(u'v')$$

$$A = \frac{\Sigma\ \text{peak}(u',v') * \begin{bmatrix} (u' - u_{mean})2 & (u' - u_{mean})*(v' - v_{mean}) \\ (u' - u_{mean})*(v' - v_{mean}) & (v' - v_{mean})2 \end{bmatrix}}{\Sigma\ \text{peak}(u',v')}$$

Where peak(u',v') is the correlation value at the chrominance [u',v']. The direction of the line is equal to the eigenvector of A that corresponds to the greater eigenvalue.

At this point, peaks having completely unreasonable properties, such as a singular correlation matrix, can be thrown out.

Determining Line Intersection

In a typical picture, some of the lines computed according to the steps listed above will converge at the chrominance of the illuminant. Other, however, will point in completely random directions. The method for analyzing the lines must be able to disregard the random lines. These random lines occur for a number of reasons:

1) the object corresponding to a peak might not have the proper reflectance properties;

2) the object corresponding to a peak might be illuminated by a local source of light whose chrominance is different from that of the global illuminant;

3) a peak might not correspond to an actual object or might consist of the superposition of two or more objects whose chrominances are slightly different from each other;

4) the shape of the chrominance distribution might have been distorted by non-linearities in the image capture process.

The problem of input non-linearities is particularly acute with photographic images. Photographic film is a highly non-linear capture medium. This non-linearity is mostly advantageous, but has two unfortunate effects in this particular situation. First, the value of neutral chrominance recorded on a photograph depends on luminance. Second if a peak is too close to the edge of the photographic gamut, its axis tends to be rotated towards the gamut edge since the more saturated parts of the object are distorted more than the less saturated parts.

One way of overcoming this problem is to "back-out" the effects of the photographic process. However, doing this accurately requires knowledge of the development history of the particular photograph together with accurate models and parameters describing the film type and development process. Many possible users for this invention will not have access to this information.

A preferred approach to this problem is as follows. First, this method computes more than one neutral chrominance corresponding to different luminance levels. In the current embodiment two chrominance values are computed, corresponding to the luminance levels above and below 50%.

Pixels of the original image are divided into two sets, one set formed of pixels having luminance less than 50%, and another set formed of pixels having luminance greater than 50%. Each set separately undergoes the steps of 1) accumulating histograms; 2) isolating peaks; 3) determining locations and axis of peaks, and 4) estimating scene illuminant. For any given luminance value, the estimate for neutral can be computed by interpolating in luminance between the highlight and shadow estimate.

Second, the method gives less importance to lines which are less likely to give a trustworthy result. Lines corresponding to highly-saturated objects should be given less weight than lines derived from less saturated objects. Lines for peaks located at high v values received diminished weights. Similarly, lines for peaks located at extreme u values (high or low) receive diminished weights.

The lines corresponding to the different histogram peaks can be further differentiated according to the intrinsic properties of each peak. In this way, lines derived from peaks which more closely resemble an ideal peak can be given relatively more influence over the final estimate. A peak that contains only a few points is less trustworthy than a peak which contains many points. Similarly a peak which is nearly round will not produce as reliable an indication of direction as a peak which is more elongated. These intrinsic factors lead to an intrinsic peak weighting which equals 0 for a completely unacceptable peak and increases as the peak becomes more acceptable.

In the preferred embodiment, the intrinsic weight depends on three factors. The first is the number of points used in the peak—the more points, the greater the weight. The second is the roundness of the peak, as determined by the relative size of the two eigenvalues associated with it—the less round, the greater the weight. The final determining factor is the width of the peak, as determined by the size of the smaller eigenvalue—the wider the peak, the greater the weight.

This method of intrinsic weighting can also be adapted to other methods for determining the chrominance of the specular component. Using Lee's method, for instance, appropriate factors would include the number of pixels used for each line and the size of the difference in slopes between the two sides of the color edge.

As an additional control on the final estimate, it is possible to incorporate a priori knowledge about the likely location of neutral. Most pictures are roughly in-balance to begin with, so that one a priori estimate is that the illuminant will be neutral. In other words, an estimate in the part of color space perceived as gray is more believable than an estimate far from that region. Alternately, if one has previously estimated a color cast for the bright (high luminance) parts of a picture, it is likely that the shadow (low luminance) values will have a similar cast. Or, any other estimate can be used, such as those described in the background. The a priori estimate should be incorporated in such a way that it does not overrule a strongly indicated specular estimate, but does act to modify a weakly indicated specular estimate.

In addition, the weighting formula can be adjusted to favor errors in a particular direction. The method described here tends to make too blue an estimate much more often than it makes too yellow an estimate. The reason seems to be as follows. Most of the area of color space which is usable for this algorithm is on the blue side of neutral. Therefore, since false indications of neutral are randomly distributed, most of them are blue. This means that everything else being equal, the algorithm should tend to trust a yellow estimate more than a blue estimate. For this reason the term corresponding to the a priori expectation has an asymmetry which favors yellow values over blue values.

The method incorporates these varying influences (such as intrinsic properties of peaks and a priori knowledge) by finding a chrominance value which minimizes the following error function:

$$error(u',v') = \Sigma weight_i * F(distance_i(u',v')) + G(u'-u_{a\ priori}, v'-v_{a\ priori})$$

where:

$weight_i$=the net weighting factor for the i'th line;

$distance_i(u', v')$=the distance from the point $[u', v']$ to the i'th line;

$[u_{a\ priori}, v_{a\ priori}]$=the a priori chrominance estimate

In the current embodiment of this invention the functions F and G are given by:

$$F(distance) = (distance/duv)^2/(1+(distance/duv)^2) \quad G(\Delta u, \Delta v) = a*(\Delta u^2 + \Delta v^2)$$

The form of the function F causes a result that, once a line gets far enough from the point $[u',v']$, moving it any farther will not have much impact on the size of the error function. In this way the error function ignores lines that are too far from the point. For the pictures tested, the best size for duv is roughly 0.005 to 0.01.

The size of the scalar a should be chosen so that the G term is important where F has a shallow minimum or where F has two or more local minima which are about the same size. The best values for a seem to be around 0.01.

The asym function causes the error function to be lower for yellow values than for blue values. One such function is defined by:

| | | | |
|---|---|---|---|
| $asym(\Delta v) = 0$ | for $\Delta v >= 0$ | | (yellow value) |
| $asym(\Delta v) = \|\Delta v\|$ / | blueWidth | for $\Delta v < 0$ | (blue value) |

The current value for blueWidth is 0.0075.

Color Mapping

After determining the size of the color cast, a color mapping is constructed and applied to the image to correct for the color cast in some way. The precise transformation can be expected to vary widely depending on the needs of the end user.

One straightforward correction determines an amount of color shift needed to map the scene illuminant to some appropriate neutral chrominance value, such as sunlight or an artificial standard like D-50. After determining the color of the illuminant, a wide variety of transformation techniques are possible.

It should be understood that the application of such mappings results in a transformation of an original image, such as a photograph, into a transformed image. In order to make the image palatable to the computer, the image has been expressed in a binary equivalent form within the image processing system. Application of the transform changes the amplitude of selected pixel values and results in a modified image still in binary form. The image then may be stored, printed, or transmitted electronically over a communication channel. Nevertheless, it is still an image.

Although a few preferred embodiments of the invention have been shown and described, it will be appreciated by those skilled in the art that changes may be made in these embodiments without departing from the principles and the spirit of the invention, the scope of which is defined in the appended claims.

What is claimed is:

1. An electronic method for measuring the color cast of the digital representation of a natural scene comprising the steps of:
   representing colors of pixels in the natural scene in digital electronic form with aid of a computer;
   isolating, with the aid of the computer, color neighborhoods for pixels of objects in the digital representation; and
   detecting, with the aid of the computer, a measure of lighting color from the isolated color neighborhoods by steps of: a) determining lines in a chrominance plane which lie along major axis of isolated color neighborhoods, and b) selecting a convergence-chrominance value near which the detected lines converge.

2. The method of claim 1 wherein the color-neighborhood isolating step includes steps of:
   counting numbers of pixels having different chrominances; and
   retaining contiguous groups of chrominances for which the number of pixels exceeds a threshold.

3. The method of claim 1 wherein the line determining step includes steps of:
   computing a correlation matrix for pixels of an isolated color range; and
   computing an eigenvector of the correlation matrix, said eigenvector determining a line in the chrominance plane.

4. The method of claim 1 wherein the convergence-chrominance selecting step includes steps of:
   assigning weighting values to lines from different neighborhoods; and
   selecting a convergence-chrominance in accordance with the assigned weights.

5. The method of claim 4 wherein the weighting value is a function of a shape in the chrominance plane of a range.

6. The method of claim 4 wherein a priority value is a function of a number of pixels in a range.

7. The method of claim 4 wherein a priority value is a function of chrominance values of pixels in a range.

8. The method of claim 7 wherein the priority value diminishes as the peak chrominance of the range approaches the edge of the gamut of the image capture device.

9. The method of claim 1 wherein the convergence-chrominance selecting step includes a steps of selecting a convergence-chrominance in accordance with an independent estimate of color cast.

10. A method for determining a color of a scene illuminant from a digital version of a natural image comprising steps of:
    measuring colors of pixels in the image;
    representing the pixel colors in electronic form with the aid of a computer;
    dividing, with the aid of the computer, the pixels into subsets corresponding to a limited range of luminance; and
    detecting, with the aid of the computer, a measure of scene illuminant as a chrominance of specularly reflected light as recorded in the limited luminance range.

11. An electronic method for compensating for color-cast in a recorded image comprising steps of:
    representing colors of pixels in the image in electronic form with the aid of a computer;
    generating a chrominance histogram with the aid of the computer;
    isolating with the aid of the computer non-circular neighborhoods around peaks in the chrominance histogram;
    detecting with the aid of the computer lines along which lie major axis of isolated neighborhoods;
    selecting with the aid of the computer a convergence-chrominance value near which the detected lines converge; and
    electronically with the aid of the computer changing pixel values with a transform that maps the convergence-chrominance to another color, thereby producing a compensated electronic image.

12. The method of claim 11 wherein the histogram generating step includes a step of generating a histogram that relates each histogram chrominance to a mean value of luminance of pixels having each histogram chrominances.

13. The method of claim 11 wherein the histogram generating step includes a step of generating a histogram that relates each histogram chrominance to a maximum value of luminance of pixels having each histogram chrominances.

14. The method of claim 11 wherein the neighborhood-isolating step includes a step of selecting contiguous groups of chrominances for which the number of pixels exceeds a threshold.

15. The method of claim 11 wherein the line-detecting step includes steps of:
    computing a correlation matrix for pixels of a neighborhood; and
    computing an eigenvector of the correlation matrix, said eigenvector determining a line in the chrominance plane.

16. The method of claim 11 wherein the convergence-chrominance selecting step includes steps of:
    assigning weighting values to lines from different neighborhoods; and
    selecting a convergence-chrominance in accordance with the assigned weights.

17. The method of claim 16 wherein a weight value is a function of degree of similarity between a shape of a neighborhood and a predetermined shape.

18. The method of claim 16 wherein a weight value is a function of a number of pixels in the neighborhood.

19. The method of claim 16 wherein a weight value is a function of chrominance values of pixels in the neighborhood.

20. The method of claim 11 wherein the convergence-chrominance selecting step includes steps of:
    computing an error value for a plurality of chrominance values, said error value depending on distance between a chrominance value and the detected lines; and
    selecting a chrominance for which the error value is a minimum as the convergence-chrominance.

21. The method of claim 1 wherein the convergence-chrominance selecting step includes steps of:
    computing an error value for a plurality of chrominance values, said error value depending on distance between a chrominance value and the detected lines; and
    selecting a chrominance for which the error value is a minimum as the convergence-chrominance.

* * * * *